United States Patent [19]

Fukuoka et al.

[11] 4,269,911
[45] May 26, 1981

[54] ALUMINUM-HALOGEN CELLS

[75] Inventors: Masayuki Fukuoka; Tatsumi Arakawa; Muneaki Kimura; Yukihisa Masukawa; Hidehiko Kobayashi, all of Fuji, Japan

[73] Assignee: Asahi Kasei Kogyo Kabushiki Kaisha, Osaka, Japan

[21] Appl. No.: 101,976

[22] Filed: Dec. 10, 1979

[30] Foreign Application Priority Data

Dec. 15, 1978 [JP] Japan ............................... 53-154190
Dec. 18, 1978 [JP] Japan ............................... 53-154935
Dec. 21, 1978 [JP] Japan ............................... 53-156873
Mar. 5, 1979 [JP] Japan ............................... 54-24517

[51] Int. Cl.³ ............................................. H01M 6/00
[52] U.S. Cl. ................................. 429/199; 429/201; 429/212; 429/218
[58] Field of Search ............... 429/101, 213, 212, 192, 429/199, 201, 191, 218

[56] References Cited

U.S. PATENT DOCUMENTS

| 3,231,427 | 1/1966 | Kirk et al. ........................ 429/213 X |
| 3,438,813 | 4/1969 | Davis .................................... 429/213 |
| 3,990,911 | 11/1976 | Mannheimer et al. .......... 429/191 X |
| 4,037,032 | 7/1977 | Nidola et al. ..................... 429/199 X |

Primary Examiner—Anthony Skapars
Attorney, Agent, or Firm—Sprung, Felfe, Horn, Lynch & Kramer

[57] ABSTRACT

An aluminum-halogen cell comprising aluminum as an anode active material and a halogen compound as a cathode active material characterized in that the layer containing the cathode active material further comprises at least one stabilizer selected from the group consisting of magnesium halides, zinc halides, organic carboxylic acids and their anhydrides, aluminum or more basic metallic salts of perhaloid acids and quaternary ammonium salts shows only slight lowering in output voltage at initial discharge when continuously discharged under a load and can give high discharge output for a remarkably long period of time.

16 Claims, 2 Drawing Figures

ALUMINUM-HALOGEN CELLS

BACKGROUND OF THE INVENTION

This invention relates to an aluminum-halogen cell, particularly to a thin aluminum-halogen cell, which shows slight lowering in output voltage at initial electrical discharge when continuously discharged under a load, e.g. under a constant load, and can hold high output after shelved for a long period of time.

As aluminum-halogen cells, there have been known cells having a structure comprising an anode active material layer containing electrochemically active aluminum, an electrochemically inert collector, and a cathode active material layer containing a halogen simple body or a halogen compound between the anode active material layer and the collector. But these cells having such a structure lower their output after shelved for a long period of time or show very large lowering in output voltage at initial discharge when continuously discharged under a load, e.g. under a constant load, and thus it was very difficult to hold high output for a long period of time. Particularly when an anode active material layer and an electrolyte layer were made thinner, there was obtained no cell which can be used practically due to danger of internal short-circuit and possibility of remarkable lowering in output voltage in a short time at continuous discharge under a load, e.g. under a constant load.

SUMMARY OF THE INVENTION

It is an object of this invention to provide a thin aluminum-halogen cell overcoming the defects as mentioned above. It is another object of this invention to provide a thin aluminum-halogen cell having a special stabilizer in a cathode active material layer containing a halogen compound.

This invention provides an aluminum-halogen cell comprising aluminum as an anode active material layer and a halogen compound as a cathode active material layer characterized in that said cathode active material layer contains as a stabilizer at least one member selected from the group consisting of magnesium halides, zinc halides, organic carboxylic acids and their anhydrides, aluminum salts of perhaloid acids, metallic salts of perhaloid acids in which said metal is more basic than aluminum, and quaternary ammonium salts of the formula:

wherein $R_1$, $R_2$, $R_3$ and $R_4$ are independently a hydrogen atom or an alkyl group having 1 to 4 carbon atoms; and X is a halogen atom, in an amount of 0.001 to 5.0 moles per mole of the cathode active material.

This invention also provides an aluminum-halogen cell further containing a separator between the cathode active material layer and the anode active material layer mentioned above.

DETAILED DESCRIPTION OF THE INVENTION

The aluminum-halogen cell of this invention can maintain the activity of the cathod active material particularly high by mixing the stabilizer in the cathode active material layer, so that shelf life of the cell is improved and lowering of output voltage at initial discharge when continuously discharged under a constant load becomes small and the cell can maintain high output for a long period of time.

Figure 1:
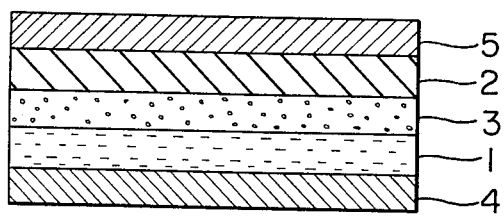
FIG. 1 is a cross-sectional view of one example of the thin aluminum-halogen cell of this invention.

The aluminum-halogen cell of this invention is illustrated in more detail referring to FIG. 1.

In FIG. 1, numeral 1 denotes an anode active material layer of thin aluminum layer, numeral 2 denotes a cathode active material layer containing a halogen compound, numeral 3 denotes a separator, numeral 4 denotes an anode collector, and numeral 5 denotes a cathode collector.

The anode active material layer 1 in FIG. 1 may be a thin aluminum plate or a thin layer of aluminum formed on an electroconductive substrate (a collector) by a conventional method such as vacuum deposition, sputtering, plating, or the like. The thickness of the anode active material layer is preferably about 1 to 100μ.

As the halogen compound contained in the cathode active material layer 2 in FIG. 1, there can be used N-halocarboxylic acid amides such as N-iodosuccinimide, N-bromosuccinimide, N-bromoacetamide, and the like, inorganic halides such as copper bromide, lead chloride, cesium iodide, and the like. Among then, N-bromosuccinimide and N-iodosuccinimide are particularly preferable. The halogen compound as the cathode active material is used in an amount of 0.1 to 10 moles per mole of aluminum used as the anode active material.

The most important thing in this invention is that the cathode active material layer contains at least one special stabilizer therein selected from the group consisting of magnesium halides, zinc halides, organic carboxylic acids and their anhydrides, aluminum salts of perhaloid acids, metallic salts of perhaloid acids in which said metal is more basic than aluminum, that is, said metal has higher ionization tendency than aluminum, and qauternary ammonium salts of the formula (I).

As the magnesium halides, there can be used magnesium fluoride, magnesium chloride, magnesium bromide, and magnesium iodide. Among them, magnesium chloride is preferable. As the zinc halides, there can be used zinc fluoride, zinc chloride, zinc bromide and zinc iodide. Among them, zinc chloride is preferable.

As the organic carboxylic acids and their anhydrides, there can be used monocarboxylic acids and their anhydrides such as acetic acid, acetic anhydride, propionic acid, n-butyric acid, n-butyric anhydride, iso-butyric acid, iso-butyric anhydride, benzoic acid, benzoic anhydride, etc., polycarboxylic acids and their anhydrides such as succinic acid, succinic anhydride, glutaric acid, glutaric anhydride, adipic acid, adipic anhydride, sebacic acid, phthalic acid, phthalic anhydride, isophthalic acid, terephthalic acid, trimellitic acid, trimellitic anhydride, pyromellitic acid, pyromellitic anhydride, etc. Among them, succinic acid is more preferable.

As the perhaloid acid salts, there can be used aluminum perchlorate, aluminum perbromate, sodium perchlorate, potassium perchlorate, magnesium perchlorate, sodium perbromate, calcium perbromate, sodium periodate, potassium periodate, etc. Among them, perchlorates are preferable.

As the quaternary ammonium salts of the formula (I), there can be used ammonium bromide, ammonium iodide, dimethylammonium bromide, dimethylammonium iodide, diethylammonium bromide, diethylmethylammonium iodide, methylethylisopropylammonium bromide, tetramethylammonium bromide, tetraethylammonium iodide, tetra-n-propylammonium bromide, tetraisopropylammonium iodide, tetra-n-butylammonium bromide, tetraisobutylammonium iodide, etc. Among them, tetra-n-butylammonium halides are preferable. Further, when a bromide is used as the cathode active material, it is preferable to use tetra-n-butylammonium bromide as the stabilizer. When an iodide is used as the cathode active material, it is preferable to use tetra-n-butylammmonium iodide as the stabilizer.

These stabilizers can be used along or as a mixture of two or more of them. By using these stabilizers together with a cathode active material uniformly mixed, the activity of the cathode active material can be maintained for a long period of time, which results in producing a high voltage for a long period of time and making the shelf life longer. These stabilizers are used in an amount of 0.001 to 5.0 moles per mole of the cathode active material.

Further, the cathode active material layer may also contain uniformly mixed carbonaceous powder such as active carbon, graphite, acethylene black, or the like in order to lower inner resistance of the cathode active material layer.

The cathode active material layer may be formed by pressure molding or by using an adhesive such as a polymer, particularly an electroconductive polymer. In order to make the layer thinner, it is preferable to use an adhesive. It is more preferable to use an adhesive together with carbonaceous powder. The thickness of the cathode active material layer is preferably 20 to 500μ, more preferably 50 to 300μ in order to make the layer thinner.

The cell of this invention can show excellent performance without containing the separator 3 shown in FIG. 1. But by disposing the separator between the anode active material layer and the cathode active material layer, the output at discharge can be stabilized remarkably and the shelf life of the cell can be improved considerably. This reason is not clear but synergistic effect of the combination of the cathode active material layer containing the stabilizer according to this invention and the separator seems to be very great. As the separator, conventional thin films such as porous polyethylene, polysulfone, polyacrylonitrile, and cellophane, non-woven fabrics, and the like may be used. The thickness of the separator is usually 20 to 500μ, more preferably 100μ or thinner.

Both the anode collector 4 and the cathode collector 5 in FIG. 1 are made of polymer films containing carbon, i.e. electroconductive plastic films. As the polymers, there can be used polyisobutylene, polybutadiene, polyethylene, polyacrylonitrile, vinyl chloride-vinyl acetate copolymer, polyvinyl chloride, polyvinyl acetate, and the like and a mixture thereof. Among them, an electroconductive plastic film made of vinyl chloride-vinyl acetate copolymer is preferable. The thickness of each collector is usually 10 to 500μ, more preferably 100μ or thinner.

Figure 2:
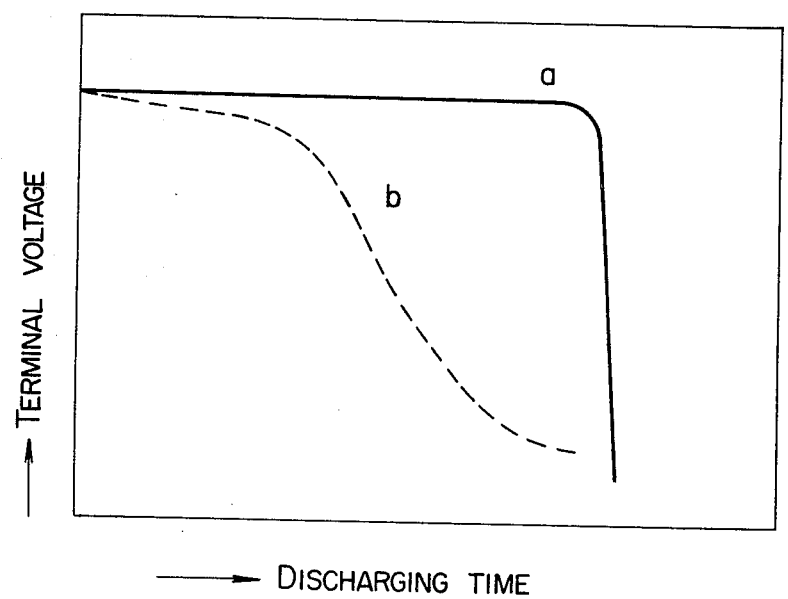
FIG. 2 is a graph showing constant load continuous discharge characteristics.

FIG. 2 is a graph showing constant load continuous discharge characteristics. In FIG. 2, the curve a shows constant load continuous discharge characteristics of the aluminum-halogen thin cell of this invention containing a special stabilizer in the cathode active material layer, and the curve b shows constant load continuous discharge characteristics of a conventional aluminum-halogen thin cell containing no stabilizer in the cathode active material layer.

As shown in FIG. 2, the aluminum-halogen thin cell of this invention shows only slight lowering in output voltage at initial discharge when continuously discharged under a constant load and can give high discharge output for a remarkably long time comparing with conventional cells.

This invention is illustrated by way of the following Examples, in which all percents are by weight unless otherwise specified.

EXAMPLE 1

On an electroconductive plastic film made of a mixture of vinyl chloride-vinyl acetate copolymer and nitrile rubber (vinyl chloride 45%, vinyl acetate 25%, butadiene 23% and acrylonitrile 7%) (CONDULON manufactured by Pervel Industry in U.S.A.) containing 75% graphite, a mixed paste of 30% of N-bromosuccinimide, 10% of graphite, 58% of an electroconductive adhesive (ECR-77 manufd. by Dow Chemical Co.) and 2% of a magnesium halide or zinc halide mentioned below as the stabilizer was coated uniformly at a proportion of 15 mg of the paste per $cm^2$ to form a cathode active material layer.

(1) Magnesium chloride
(2) Magnesium bromide
(3) Zinc chloride
(4) Zinc iodide

On the other hand, for comparison, a cathode active material layer containing no stabilizer was formed as follows. That is, on the same electroconductive plastic film as mentioned above, a mixed paste containing 30% of N-bromosuccinimide, 60% of the same electroconductive adhesive as mentioned above and 10% of graphite was coated uniformly at a proportion of 15 mg of the paste per $cm^2$.

Subsequently, on an electroconductive plastic film made of the same material as mentioned above (CONDULON manufactured by Pervel Industry in U.S.A.) containing 75% graphite, aluminum was vacuum deposited with a thickness of 2.5μ. The resulting film was laminated on the cathode active material layer so that the aluminum layer was in contact with the cathode active material layer. Thus, five kinds of aluminum-bromine system cells having an area of 4 $cm^2$ were produced.

Properties of these cells when discharged continuously under a constant load of 6.5 kΩ are listed in Table 1 and retentions of open-circuit voltage after stored for 3 months at 25° C. are listed in Table 2.

TABLE 1

| Stabilizer | Terminal voltage at initial discharge | Time reqired for lowering terminal voltage by 10% |
|---|---|---|
| (1) | 1.7 V | 3.0 (hours) |
| (2) | " | 2.5 |
| (3) | " | 2.9 |
| (4) | " | 2.3 |
| None | " | 0.5 |

TABLE 2

| Stabilizer | Open-circuit voltage immediately after the production | Retention of open-circuit voltage after 3 months |
|---|---|---|
| (1) | 1.7 V | 96 (%) |
| (2) | " | 94 |
| (3) | " | 95 |
| (4) | " | 94 |
| None | " | 41 |

As is clear from Tables 1 and 2, the effect of magnesium halides or zinc halides is clearly shown. Particularly, magnesium chloride and zinc chloride are more effective.

EXAMPLE 2

The procedures of Example 1 were repeated except for using N-iodosuccinimide in place of N-bormosuccinimide and using the following stabilizer:

(5) Magnesium chloride
(6) Magnesium fluoride
(7) Zinc chloride
(8) Zinc bromide The thus produced aluminum-iodine system cells having an area of 4 cm$^2$ had properties as shown in Tables 3 and 4 under the same condition as described in Example 1.

TABLE 3

| Stabilizer | Terminal voltage at initial discharge | Time required for lowering terminal voltage by 10% |
|---|---|---|
| (5) | 1.4 V | 2.9 (hours) |
| (6) | " | 2.4 |
| (7) | " | 2.8 |
| (8) | " | 2.4 |
| None | " | 0.5 |

TABLE 4

| Stabilizer | Open-circuit voltage immediately after the production | Retention of open-circuit voltage after 3 months |
|---|---|---|
| (5) | 1.4 V | 96 (%) |
| (6) | " | 94 |
| (7) | " | 96 |
| (8) | " | 94 |
| None | " | 40 |

Tables 3 and 4 clearly show the effect of magnesium halides or zinc halides. Particularly, magnesium chloride and zinc chloride are more effective.

EXAMPLE 3

The procedures of Example 1 were repeated except for disposing porous cellophane of 40μ thick between the cathode active material layer and the anode active material layer. The thus produced aluminum-bromine system cells had properties as shown in Tables 5 and 6 under the same conditions as described in Example 1.

TABLE 5

| Stabilizer | Terminal voltage at initial discharge | Time required for lowering terminal voltage by 10% |
|---|---|---|
| (1) | 1.7 V | 12.0 (hours) |
| (2) | " | 10.8 |
| (3) | " | 11.7 |
| (4) | " | 10.5 |
| None | " | 1.1 |

TABLE 6

| Stabilizer | Open-circuit voltage immediately after the production | Retention of open-circuit voltage after 3 months |
|---|---|---|
| (1) | 1.7 V | 99 (%) |
| (2) | " | 97 |
| (3) | " | 99 |
| (4) | " | 97 |
| None | " | 50 |

Tables 5 and 6 clearly show the effect of magnesium halides and zinc halides. Particularly, magnesium chloride and zinc chloride are more effective. In addition, the effect of separator is clearly shown in Tables 5 and 6.

EXAMPLE 4

The procedures of Example 1 were repeated except for using the following stabilizer in place of zinc halides or magnesium halides:

(9) Succinic acid
(10) Succinic anhydride
(11) Benzoic acid
(12) Benzoic anhydride
(13) Trimellitic anhydride The thus produced aluminum-bromine system cells having an area of 4 cm$^2$ had properties as shown in Tables 7 and 8 under the same conditions as described in Example 1.

TABLE 7

| Stabilizer | Terminal voltage at initial discharge | Time required for lowering terminal voltage by 10% |
|---|---|---|
| (9) | 1.7 V | 1.9 (hours) |
| (10) | " | 1.7 |
| (11) | " | 1.8 |
| (12) | " | 1.6 |
| (13) | " | 1.8 |
| None | " | 0.5 |

TABLE 8

| Stabilizer | Open-circuit voltage immediately after the production | Retention of open-circuit voltage after 3 months |
|---|---|---|
| (9) | 1.7 V | 94 (%) |
| (10) | " | 94 |
| (11) | " | 93 |
| (12) | " | 94 |
| (13) | " | 94 |
| None | " | 41 |

Tables 7 and 8 clearly show the effect of carboxylic acids or their anhydrides as the stabilizer.

EXAMPLE 5

The procedures of Example 4 were repeated except for disposing porous cellophane of 40μ thick between the cathode active material layer and the anode active material layer. The thus produced aluminum-bromine system cells had properties as shown in Tables 9 and 10 under the same conditions as described in Example 1.

TABLE 9

| Stabilizer | Terminal voltage at initial discharge | Time required for lowering terminal voltage by 10% |
| --- | --- | --- |
| (9) | 1.7 V | 7.5 (hours) |
| (10) | " | 6.7 |
| (11) | " | 6.8 |
| (12) | " | 6.7 |
| (13) | " | 6.6 |
| None | " | 0.8 |

TABLE 10

| Stabilizer | Open-circuit voltage immediately after the production | Retention of open-circuit voltage after 3 months |
| --- | --- | --- |
| (9) | 1.7 V | 97 (%) |
| (10) | " | 97 |
| (11) | " | 96 |
| (12) | " | 96 |
| (13) | " | 97 |
| None | " | 44 |

Tables 9 and 10 clearly show the effect of carboxylic acids and their anhydrides as the stabilizer. Further, the effect of separator is clearly shown in Tables 9 and 10.

EXAMPLE 6

The procedures of Example 1 were repeated except for using the following stabilizer in place of magnesium halides or zinc halides:
(14) Aluminum perchlorate
(15) Aluminum periodate
(16) Magnesium perchlorate
(17) Potassium periodate The thus produced aluminum-bromine system cells having an area of 4 cm$^2$ had properties as shown in Table 11 under the same conditions as described in Example 1.

TABLE 11

| Stabilizer | Open-circuit voltage (V) | Short-circuit current (mA/cm$^2$) | Retention of open-circuit voltage after 3 months (%) |
| --- | --- | --- | --- |
| (14) | 1.7 | 140 | 90.0 |
| (15) | " | " | 75.0 |
| (16) | " | " | 91.0 |
| (17) | " | " | 76.0 |
| None | " | " | 32.0 |

Table 11 clearly shows the effect of perhaloid acid salts, particularly perchlorates.

EXAMPLE 7

The procedures of Example 6 were repeated except for disposing porous cellophane of 40μ thick between the cathode active material layer and the anode active material layer. The thus produced aluminum-bromine system cells had properties as shown in Table 12 under the same conditions as described in Example 1.

TABLE 12

| Stabilizer | Open-circuit voltage (V) | Short-circuit current (mA/cm$^2$) | Retention of open-circuit voltage after 3 months (%) |
| --- | --- | --- | --- |
| (14) | 1.7 | 140 | 92.0 |
| (15) | " | " | 80.0 |
| (16) | " | " | 93.5 |
| (17) | " | " | 80.0 |
| None | " | " | 50.0 |

Table 12 clearly shows the effect of perhaloid acid salts, particularly perchlorates. Further, the effect of separator is clearly shown in Table 12.

EXAMPLE 8

The procedures of Example 1 were repeated except for using the following stabilizer in place of magnesium halides or zinc halides:
(18) Tetramethylammonium bromide
(19) Tetraethylammonium bromide
(20) Tetra-n-butylammonium bromide
(21) Tetra-n-butylammonium iodide The thus produced aluminum-bromine system cells having an area of 4 cm$^2$ had properties as shown in Table 13 under the same conditions as described in Example 1.

TABLE 13

| Stabilizer | Open-circuit voltage (V) | Short-circuit current (mA/cm$^2$) | Retention of open-circuit voltage after 3 months (%) |
| --- | --- | --- | --- |
| (18) | 1.7 | 140 | 82.0 |
| (19) | " | " | 82.0 |
| (20) | " | " | 93.5 |
| (21) | " | " | 84.5 |
| None | " | " | 32.0 |

Table 13 clearly shows the effect of the quaternary ammonium salts of the formula (I) as the stabilizer. Particularly, the effect of tetra-n-butylammonium bromide is remarkable.

EXAMPLE 9

The procedures of Example 8 were repeated except for disposing porous cellophane of 40μ thick between the cathode active material layer and the anode active material layer. The thus produced aluminum-bromine system cells had properties as shown in Table 14 under the same conditions as described in Example 1.

TABLE 14

| Stabilizer | Open-circuit voltage (V) | Short-circuit current (mA/cm$^2$) | Retention of open-circuit voltage after 3 months (%) |
| --- | --- | --- | --- |
| (18) | 1.7 | 140 | 92.0 |
| (19) | " | " | 92.0 |
| (20) | " | " | 95.5 |
| (21) | " | " | 92.5 |
| None | " | " | 50.0 |

Table 14 clearly shows the effect of the quaternary ammonium salts of the formula (I) as the stabilizer. Particularly, the effect of tetra-n-butylammonium bromide is remarkable. Further, the effect of separator is clearly shown in Table 14.

What is claimed is:

1. An aluminum-halogen cell comprising an anode collector, an anode active material layer of aluminum, a cathode active material layer comprising at least one halogen compound selected from the group consisting of N-halocarboxylic acid amides, copper bromide, lead chloride and cesium iodide, and a cathode collector, said cathode active material layer containing as a stabilizer at least one member selected from the group consisting of magnesium halides, zinc halides, organic carboxylic acids and their anhydrides, aluminum salts of perhaloid acids, metallic salts of perhaloid acids in which said metal is more basic than aluminum, and quaternary ammonium salts of the formula:

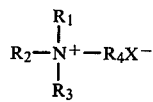

wherein $R_1$, $R_2$, $R_3$ and $R_4$ are independently a hydrogen atom or an alkyl group having 1 to 4 carbon atoms; and X is a halogen atom, in an amount of 0.001 to 5.0 moles per mole of the cathode active material.

2. A cell according to claim 1, which further comprises a separator between the anode active material layer and the cathode active material layer.

3. A cell according to claim 1, wherein the cathode active material is N-iodosuccinimide or N-bromosuccinimide.

4. A cell according to claim 2, wherein the cathode active material is N-iodosuccinimide or N-bromosuccinimide.

5. A cell according to claim 1, wherein the stabilizer is a magnesium halide or a zinc halide.

6. A cell according to claim 1, wherein the stabilizer is magnesium chloride or zinc chloride.

7. A cell according to claim 1, wherein the stabilizer is a monocarboxylic acid or anhydride thereof or a polycarboxylic acid or anhydride thereof.

8. A cell according to claim 1, wherein the stabilizer is succinic acid.

9. A cell according to claim 1, wherein the stabilizer is a perchlorate, perbromate, or periodate of aluminum, magnesium, calcium, sodium or potassium.

10. A cell according to claim 1, wherein the stabilizer is aluminum per chlorate or magnesium per chlorate.

11. A cell according to claim 1, wherein the stabilizer is a tetraalkylammonium bromide or iodide.

12. A cell according to claim 1, wherein the stabilizer is tetra-n-butylammonium bromide or iodide.

13. A cell according to claim 1, wherein the cathode active material is N-bromosuccinimide and the stabilizer is tetra-n-butylammonium bromide.

14. A cell according to claim 1, wherein the cathode active material is N-iodosuccinimide and the stabilizer is tetra-n-butylammonium iodide.

15. A cell according to claim 1, wherein the thickness of the anode active material layer is 1 to 100$\mu$ and the thickness of the cathode active material layer is 20 to 500$\mu$.

16. A cell according to claim 2, wherein the thickness of the separator is 20 to 500$\mu$.

* * * * *